UNITED STATES PATENT OFFICE.

E. D. SEELY, OF BROOKLINE, MASSACHUSETTS.

IMPROVED BURNING-FLUID.

Specification forming part of Letters Patent No. 57,390, dated August 21, 1866.

*To all whom it may concern:*

Be it known that I, E. D. SEELY, of Brookline, Norfolk county, and State of Massachusetts, have invented a new and Improved Process for Rendering Naphtha Non-Explosive; and I do hereby declare that the following is a full, clear, and exact description thereof, which will enable others skilled in the art to make and use the same.

This invention relates to a new burning-fluid called "red kerosene," and produced by rendering naphtha or benzine from petroleum non-explosive.

In carrying out my process I take separately three gallons of naphtha, of about 65° gravity, and mix into the first gallon two pounds of white-oak bark, and mix into the second gallon two pounds of alkanet-wood, and mix into the third gallon two pounds of common salt. Then I take one pint of alcohol and one ounce of cyanide of potassium, and after the several solutions are complete (which will be in about five hours, more or less) I mix them together, and my red kerosene is ready for use.

By the astringent property of white-oak bark the excess of carbon in the naphtha is neutralized and smoking is prevented. The alkanet-wood serves simply to impart to the mixture the desired color. The salt contained in the third gallon facilitates the combination of the whole mixture, and the cyanide of potassium cuts the solid parts contained in the mixture and renders the solution permanent.

By these means a liquid is produced which requires about 320° before it explodes, whereas ordinary kerosene explodes at a temperature of 130° to 150°, and a burning-fluid is obtained which is cheap, perfectly safe, and gives a brilliant light.

What I claim as new, and desire to secure by Letters Patent, is—

1. The within-described compound, which I term "red kerosene," as a new article of manufacture.

2. The within-described process of rendering naphtha non-explosive by treating the same substantially in the manner herein set forth.

E. D. SEELY.

Witnesses:
 WM. F. MCNAMARA,
 ALEX. F. ROBERTS.